United States Patent [19]

Bunch et al.

[11] 4,121,216
[45] Oct. 17, 1978

[54] DIRECTION FINDER ANTENNA AND SYSTEM

[75] Inventors: Carroll S. Bunch, Dallas, Tex.; Jerry L. Perry, Huntsville, Ala.; Robert L. Marcucci, San Jose, Calif.

[73] Assignee: E-Systems, Inc., Dallas, Tex.

[21] Appl. No.: 227,544

[22] Filed: Feb. 18, 1972

[51] Int. Cl.² ............................ G01S 5/02; G01S 5/04
[52] U.S. Cl. ................................. 343/113 R; 343/119
[58] Field of Search ..................... 343/113 R, 121, 119

[56] References Cited

U.S. PATENT DOCUMENTS

| | | | |
|---|---|---|---|
| 1,839,290 | 1/1932 | Bailey | 343/121 |
| 2,256,619 | 9/1941 | Luck | 343/726 |
| 3,355,736 | 11/1967 | Perper | 343/113 R |
| 3,369,235 | 2/1968 | Odams et al. | 343/113 R |
| 3,392,392 | 7/1968 | Magnuski | 343/113 R |

*Primary Examiner*—S. C. Buczinski
*Attorney, Agent, or Firm*—Robert V. Wilder

[57] ABSTRACT

Unambiguous 360° high frequency direction finding is achieved by the use of an energy receiving antenna having two orthogonally mounted vertically oriented, loop antennas, a monopole antenna and a horizontally oriented loop antenna. Signals from the two orthogonally mounted loop antennas contain bearing information for processing in a phase comparison system. The monopole antenna signal provides for elimination of any ambiguity in the bearing information signal as received from the two orthogonally mounted loop antennas. Sensing the polarization of the energy waves at the receiving antennas is provided by comparison of the horizontal loop antenna signal with the resultant signal obtained by the quadrature summation of the signal from the two vertical loop antennas. A bearing indication from the two orthogonally mounted loop antennas is generated by phase shifting one of the antenna signals. This phase shifted signal is combined with the second loop antenna signal in both a summing network and a difference network. A phase detector coupled to the summing network and the difference network provides a signal representing a multiple of the bearing angle between the emitting source and the receiving antenna. The ambiguity in this multiple of the bearing angle is removed by coupling a phase detector to the summing network and the monopole antenna. The output of this second phase detector is combined with the output of the first phase detector in an ambiguity resolver to produce a true bearing angle.

11 Claims, 9 Drawing Figures

DIRECTION FINDER ANTENNA AND SYSTEM

This invention relates to a direction finding system, and more particularly to an antenna and a direction finder system for translating bearing amplitude information into phase comparison data for unambiguous angular measurement between a reference and an emitting radiation source.

The practical use of loop antennas for determining the direction of arrival of signal sources was employed as early as 1938 by English, American and German shipping lines for navigational purposes. At about this time, loop antennas of exceptionally large size were experimentally used on shipboard installations. These original loop antennas, called the "Bellini-Tosi" system, were single turn unshielded loops. Later developments of the Bellini-Tosi loops result in smaller multiturn shielded loops. Angular measurements were obtained by rotating the loops and detecting a null in a simple receiving system employing a visual readout. Since the loop antenna exhibits a figure-8 pattern, these systems were invariably confronted with an ambiguous reading 180° from the true reading.

Since these early years, advances in technology for both the loop antenna and radio direction finding equipment has resulted in small cross loop antenna direction finder systems capable of installation on some larger type aircraft. Heretofore, however, no significant advancement in the loop antenna has been achieved, other than replacing the rotating antenna pedestal with a small rotating pickoff loop, or has the direction finding system provided an unambiguous bearing signal.

In accordance with the present invention, a crossed loop antenna array is composed of two active vertical loop antennas orthogonally mounted, an active horizontal loop antenna located at the mid-point of the vertical loops and an active vertical sleeved monopole antenna mounted on the mutual axis of the vertical loops. The two vertical orthogonally mounted loop antennas provide the bearing information signals, the horizontal loop antenna provides for polarization sensing of the received radiation and the active vertical sleeved monopole antenna provides a signal for minimizing ambiguities in the bearing angle signal.

Bearing information from the two orthogonally mounted vertical loop antennas is derived from the relative amplitude of the two vertical loop signals. The output of the horizontal loop is used to compare the magnitude of horizontal polarization to vertical polarization. If the horizontal component is excessively high due to either a well balanced horizontal dipole or sky waves, the resultant bearing information from the vertical loops is erroneous and the data must be modified.

According to the present invention, the system for determining the location of a source of emitting radiation with respect to an energy receiving antenna, as described, includes shifting the signal phase from one of the orthogonally mounted loop antennas with respect to the signal of the second loop antenna. This phase shifted signal and the signal from the second antenna are coupled to a summing network wherein a signal is generated representing the sum of the two coupled signals. Similarly, the phase shifted signal and the signal from the second antenna are coupled to a difference network for generating a signal representing the difference between the two coupled signals. A phase detector responsive to the output of the summing network and difference network generates a signal representing a multiple of the bearing angle to the emitting source. A second phase detector, coupled to the signal from the monopole antenna and connected to the summing network, generates a signal representing a "coarse" direction to the emitting source. Both the signal representing the multiple of the bearing angle and the coarse direction signal are coupled to an ambiguity resolver for generating the bearing angle signal.

In accordance with another embodiment of the invention, the bearing angle signal, as generated above, is corrected for excessive horizontal polarization. If a comparison of the signal from the horizontal loop antenna with the signal from the quadrature summation of the two vertical loop antennas proves to be excessive, the bearing angle signal is modified to correct for polarization error.

A more complete understanding of the invention and its advantages will be apparent from the specification and claims and from the accompanying drawings illustrative of the invention.

Referring to the drawings.

Figure 1:
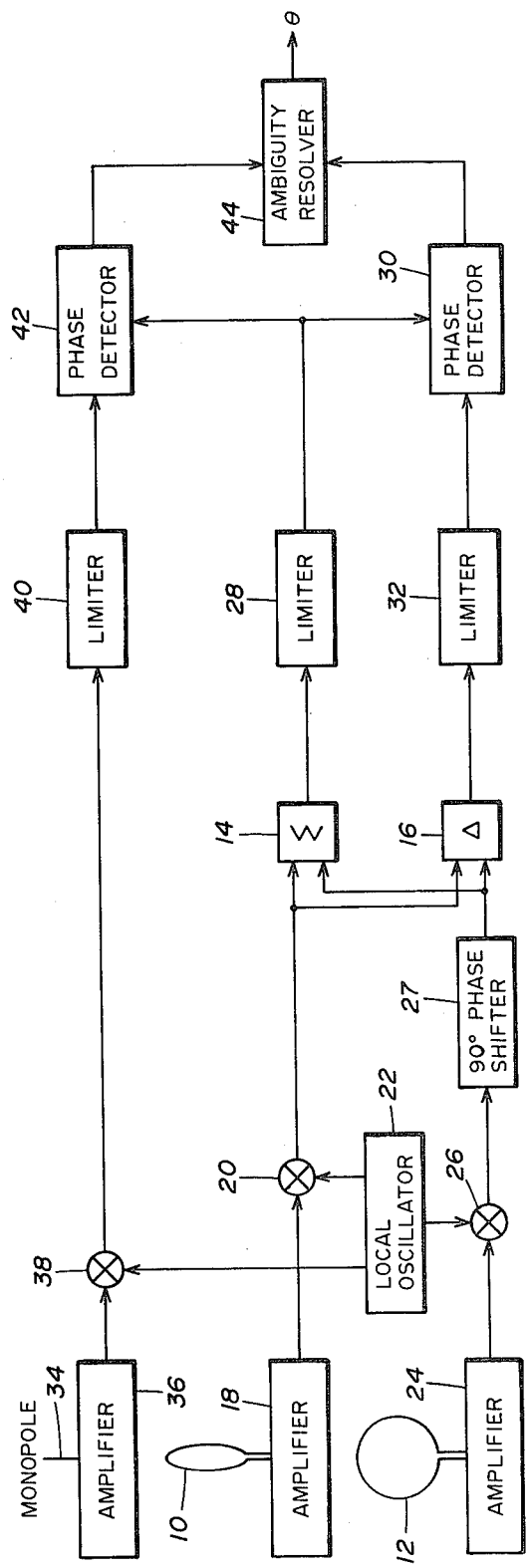
FIG. 1 is a block diagram of an unambiguous 360° high frequency direction finding system in accordance with the present invention.

Referring to FIG. 1, an antenna array, shown schematically, for a direction finder system is composed of orthogonally oriented vertical loops 10 and 12 which produce sine and cosine signal functions with amplitudes dependent on direction of arrival of radiation from an emitting source, the location of which is to be determined. The loop antenna signals are related such that, through processing, the signal functions are reduced to provide amplitude or phase direction of arrival information. The primary information is signal amplitude which, when directly compared, will provide an angle of arrival. The amplitude comparison technique, however, has limitations in that, at the quadrature space terminals, the output of the loop is at a minimal point whereby both atmospheric and system noise tend to "fill" the null thus desensitizing the system direction finding capability. In accordance with the present invention, the output of the two loops 10 and 12 are combined through sum and difference networks 14 and 16 whereby a comparison is accomplished by phase measurement.

Prior to processing in the summing network 14 and the difference network 16, a signal from the loop 10 is amplified in an amplifier 18 having an output given by the function:

$$e_{10} = A \sin \theta \cos \omega t,$$

where
$A$ = the maximum loop response,
$\theta$ = the mechanical bearing to the emitting source, and
$\omega = 2\pi f, f =$ the frequency of the emitting source. A signal from the amplifier 18 is combined in a mixer 20 with a signal from a local oscillator 22. An output from the mixer 20 is given by the function:

$$e'_{10} = A \sin \theta \cos \omega_1 t.$$

This signal is connected to one input of the summing network 14 and one input to the difference network 16.

A bearing information signal from the loop 12 is amplified in an amplifier 24 which has an output given by the function:

$$e_{12} = A \cos \theta \cos \omega t.$$

This signal is coupled to a mixer 26 wherein it is combined with the local oscillator output. Connected to the mixer 26 is a phase shift network 27 wherein a 90° phase shift is imparted to the signal at the output of the mixer 26. An output of the phase shift network 27 is given by the function:

$$e'_{12} = A \cos \theta \sin \omega_1 t,$$

which is simultaneously applied to one input of the summing network 14 and one input of the difference network 16.

An output from the summing network 14, which is given by the function:

$$\Sigma = A \sin (\omega t + \theta),$$

is connected to a limiter 28 wherein the signal is limited to the linear portions thereof. A signal from the limiter 28 is applied to one input of a phase detector 30. The output from the difference network 16, which is given by the function:

$$\Delta = A \sin (\omega t - \theta),$$

is applied to a limiter 32 wherein the output of the network 16 is limited to the linear portions thereof. From the limiter 32 the difference network signal is applied to a second input of the phase detector 30.

The two equal amplitude antenna array outputs are processed in the phase detector 30 to yield an electrical angle equal to a multiple of the bearing angle to the emitting source. This phase output is independent of frequency and linearly related to the mechanical angle, but is ambiguous. The ambiguity of the output of the phase detector 30 is removed by comparing the resultant to a signal from the monopole antenna 34.

A signal from the monopole 34 is amplified in an amplifier 36 which has an output given by the function:

$$e_{34} = B \sin \omega t,$$

where $B$ = the maximum antenna response. This signal from the amplifier 36 is combined with the output of the local oscillator 22 in a mixer 38 with the resultant function:

$$e'_{34} = B \sin \omega_1 t,$$

applied to the input of a limiter 40. The limiter 40 limits the monopole antenna signal to linear portions thereof. An output from the limiter 40 is applied to one input of a coarse phase detector 42. A second input to the phase detector 42 is the output of the summing network 14 as limited by the limiter 28. The signal from the phase detector 42 is equal to:

$$e_{42} = \theta + \omega_1 t.$$

The output from the phase detectors 30 and 42 are each coupled to an ambiguity resolver 44 wherein the output of the phase detector 30 is combined with the output of the phase detector 42 thereby yielding the bearing angle signal $\theta$ which is a mechanical bearing angle between an emitting source and the antenna array, comprising loops 10 and 12 and the monopole antenna 34.

Figure 2:
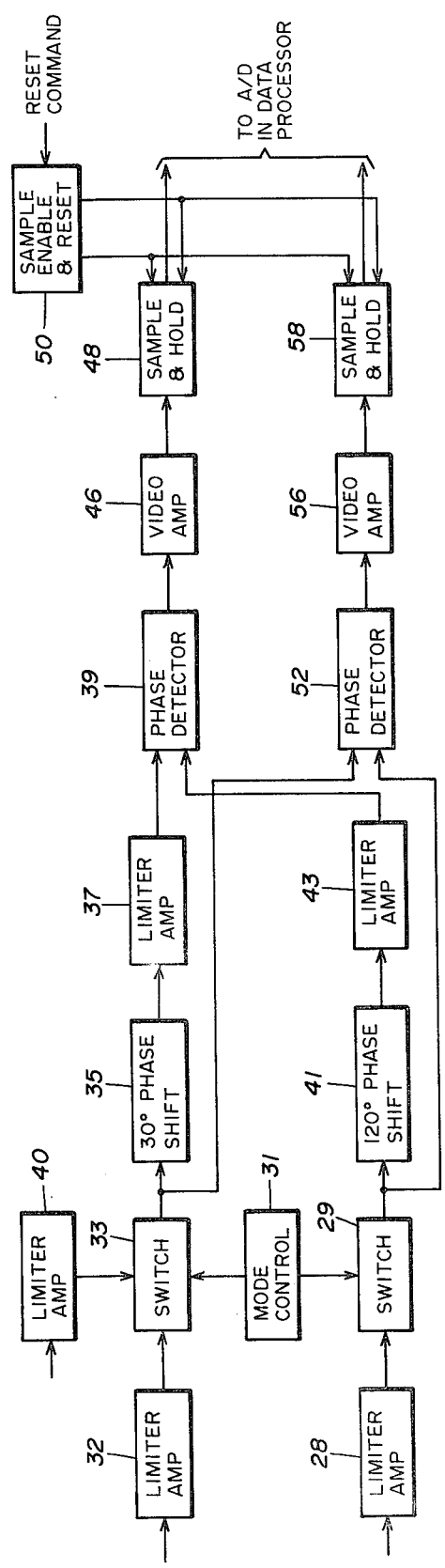
FIG. 2 is a block diagram of a system for processing signals from the sum and difference networks of FIG. 1.
Figure 3:
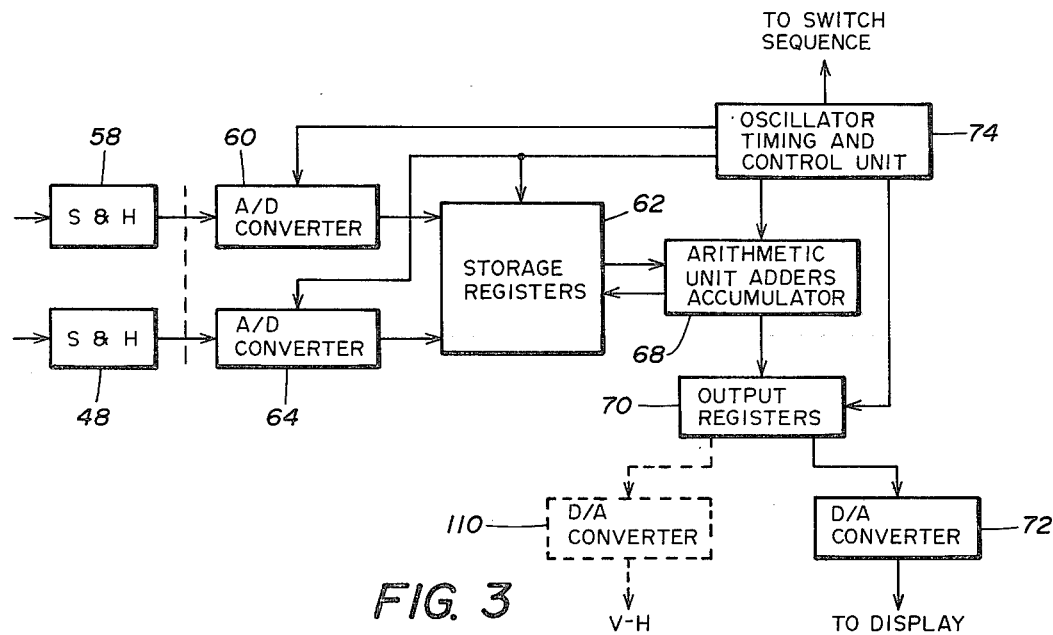
FIG. 3 is a block diagram of a system for processing the output voltages from the system of FIG. 2 into a bearing angle signal and a ratio of vertical to horizontal polarization.

Referring to FIGS. 2 and 3, there is shown a block diagram of a system for processing the output of the sum and difference networks to generate a signal which represents the bearing angle to the emitting source. An output from the limiter 32 is applied to a phase shift network 35 through a switch 33 under the control of a mode control circuit 31. The phase shift network 35 imparts a 30° phase shift to the output of the difference network 16. From the phase shift network 35 the signal passes through a limiter 37 and then to one input of a quadrature phase detector 39. A signal from the limiter 28 is applied to a phase shift network 41 through a switch 29. The phase shift network 41 introduces a 120° phase shift into the output of the summing network 14. From the phase shift network 41 the signal passes through a limiter 43 and then to a second input of the quadrature phase detector 39.

Figure 5:
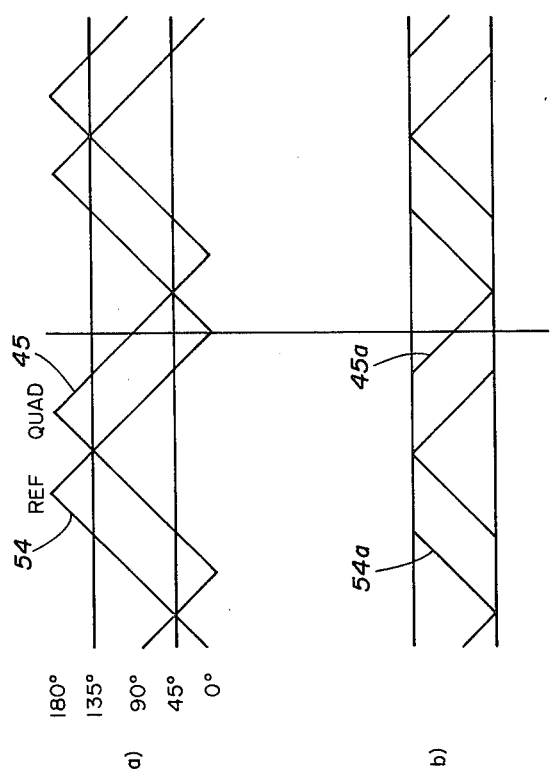
FIG. 5 is the series of curves representing the reference and quadrature voltages as generated by the system of FIG. 2.

With a 30° phase shift in the channel from the difference network 16 and a 120° phase shift in the channel from the summing network 14, there exists a 90° phase shift between the two signals applied to the phase detector 39. The phase detector 39 compares the two input signals thereto to produce a signal having the wave form 45, as shown in FIG. 5a. An output from the phase detector 39 is applied to a video amplifier 46 and then to a sample and hold circuit (S & H) 48 under the control of a sample, enable and reset network 50.

A voltage from the limiter 28 and a voltage from the limiter 32 are directly coupled to the individual inputs of a reference (inphase) phase detector 52. This phase detector 52 is similar to the detector 39 and compares the two input signals to produce a voltage having the wave form 54 of FIG. 5a. The signal from the detector 52 passes through a video amplifier 56 to a sample and hold circuit (S & H) 58 also under control of the sample, enable and reset network 50.

Also shown in FIG. 2 is the limiter 40 coupled to the switch 33 and responsive to the signal from the monopole antenna 34. The output of the limiter 40 through the sample and hold circuits 48 and 58 is coupled to the phase translator system of FIG. 3 under control of the mode control 31 to resolve the ambiguity of the bearing angle data as computed from the outputs of the limiters 28 and 32.

The analog signal from the sample and hold circuit 58, in the phase measurement mode and the ambiguity resolving mode, is digitized into an eight bit binary signal in an analog-to-digital converter 60. This eight bit binary code is then stored in a register matrix 62. Similarly, the output of the sample and hold circuit 48 is digitized into an eight bit binary code by an analog-to-digital converter 64 and then stored in the register matrix 62. The output of the limiter 40 is digitized into an eight bit binary code in the analog-to-digital converter 60 and also stored in the register matrix 62, during the ambiguity resolving mode.

Digitized phase information is entered into an arithmetic unit 68 that contains all the necessary logic circuitry for comparison, calculations, and corrections necessary to produce the phase output signal related to bearing data. An output from the arithmetic unit 68 is shifted into an output register 70 and in turn converted to an analog voltage in a digital-to-analog converter 72. An output from the converter 72 is an analog voltage representing a bearing angle and is connected to a display (not shown). The entire phase translator system is sequentially controlled by an oscillator 74 including timing and control units.

For the system of FIG. 1, the sequence of the translator operation is divided into two modes, these modes are phase measurement and ambiguity removal processing. The system is initialized to begin with the phase measurement mode wherein the signals from the sample and hold circuits 48 and 58 are processed to produce a signal representing a multiple of the bearing angle. In the phase measurement mode, phase information is digitized and entered into the arithmetic unit 68, and initial calculations are made in preparation for solving the ambiguity equation. The ambiguity removable processing mode deals with the correction and extension of the phase measurement to obtain a nonambiguous digital word representing a true bearing angle, which is the direction angle. It is this last signal that is applied to the output register 70 and converted into an analog voltage in the digital-to-analog converter 72.

Figure 4:
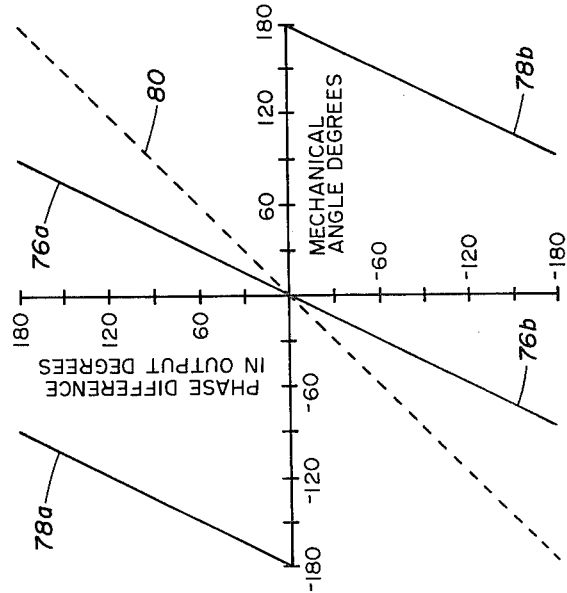
FIG. 4 is a plot of phase difference in output degrees versus mechanical angle wherein the solid curve represents an electrical angle equal to a multiple of two of the bearing angles and the dash line indicates in electrical degrees the output of the monopole antenna.

In operation of the system of FIGS. 1-3, radiation emitting from a source to be located is incident upon the orthogonally positioned loop antennas 10 and 12. Each of these two antennas produces an equal amplitude output which when processed through the sum and difference networks 14 and 16 and the phase detector 30 yields an electrical angle equal to two times the bearing angle. This is graphically illustrated in FIG. 4 by the solid line curves 76a, 76b, 78a and 78b. As illustrated in FIG. 4, the phase output of the detector 30 is independent of frequency and linearly related to the mechanical angle, but is ambiguous. The ambiguity residing in that an output of the detector 30 may appear along either curves 76a or 78a in one instance, or along curves 76b and 78b in another instance.

In accordance with the present invention, this ambiguity is resolved by comparing the direction finding results at the phase detector 30 to the output of the monopole antenna 34 which also responds to energy emitting from the source to be located. The output of the monopole antenna 34 is plotted in FIG. 4 as the dashed line curve 80. From FIG. 4 it will be seen that for a situation where the output of the phase detector 30 appears along either curves 76a or 78a that by comparing this ambiguous signal with a signal as along the curve 80, the ambiguity may be removed. That is, if the output of the monopole is along the curve 80 somewhere in the quadrant of the curve 76a, then the true bearing angle will be given by the curve 76a. Although there may be a similar point along the curve 78a, there would be no comparing signal along curve 80 for this latter point.

To resolve the ambiguity of the output of the phase detector 30, the output of the limiters 28 and 32 are processed through the quadrature phase detector 39 and the reference phase detector 52 to produce the curves of the phase detector voltages as shown in FIG. 5a. The two curves, quadrature 45 and reference 54, are displayed by 90°. The two analog-to-digital converters 60 and 64 digitize the analog signals from the detectors 39 and 52 for further digital processing by the arithmetic unit 68. Prior to processing, the converted signals are stored in the register matrix 62.

Figure 6:
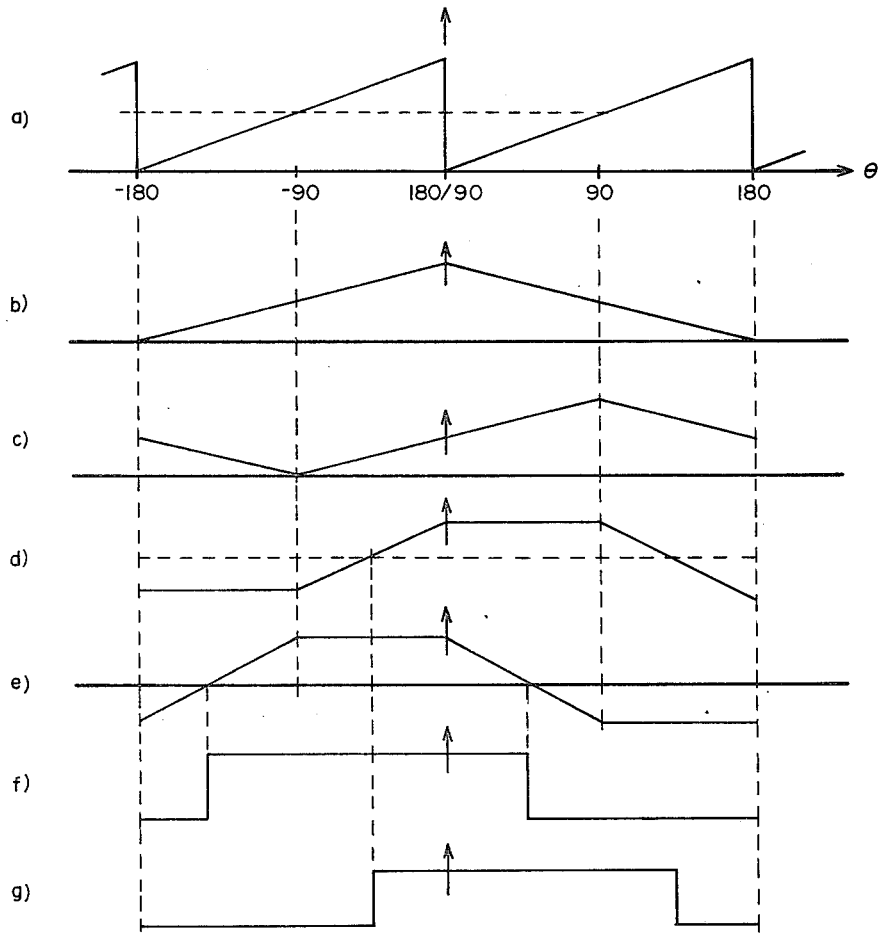
FIG. 6 is a series of curves representing voltages as processed by the phase translator system of FIG. 3 wherein the saw tooth wave form results from a combination of the reference and quadrature wave forms as illustrated in FIG. 5.

The translator processing sequence begins with a directional finder command from the unit 74 to initiate the phase measurement mode. When in the phase measurement mode, the arithmetic unit 68 initially scans the data for the reference and quadrature voltages and eliminates everything above a 135° level and below a 45° level. This results in the curves 45a and 54a of FIG. 5b. The arithmetic unit 68 then performs calculations on the data represented by the curves 45a and 54a to produce data then represents two points on the curve shown in FIG. 6a. One of these points would appear along the left ramp and second point at the same location along the right ramp. The saw tooth wave form of FIG. 6a represents 720 electrical degrees or 360 mechanical degrees of bearing to the emitting source. Since the data resulting from the bearing mode of operation of the phase translator system of FIG. 3 is ambiguous, the system then proceeds to the ambiguity mode.

In the second mode of the translator sequence the mode begins by digitizing the output of the limiter 40 for storage in the register matrix 62. In this mode, the data from the sample and hold networks 48 and 58 are accepted by the arithmetic unit 68 wherein addition and averaging generates data as illustrated by the curves $b$ and $c$ of FIG. 6. The arithmetic unit 68 then sums the data as represented by the curves $b$ and $c$ to produce data as represented by the curve $d$. Simultaneously, the arithmetic unit finds the difference between the data as illustrated by the curves $b$ and $c$ to produce data as represented by the curve $e$. Still in the ambiguity mode, the arithmetic unit operates on the data as represented by the curve $d$ to produce a square wave voltage as given at curve $g$. Simultaneously, the arithmetic unit operates on a data as represented by the curve $e$ to produce the square wave of curve $f$.

Next, the arithmetic unit 68 makes a logic determination of the level of the curves $e$ and $f$ at the bearing angle data along the curve $a$, as produced in the phase measurement mode, to determine which of the two readings represents the bearing angle. The logic determination as produced by the arithmetic unit 69 is given in Table I.

TABLE I

If: $(a) < 180°$ and $(g) = 1$ then $\theta = (a)/2$
: $(a) > 180°$ and $(f) = 1$ then $\theta = (a)/2 - 180°$ : (a) > 180° and (f) = 0 then θ = (a)/2
: (a) < 180° and (g) = 0 then θ = (a)/2 – 180°

Assume that the points on the curve resulting from operation of the translator in the phase measurement mode lie along the left and right ramps of the saw tooth curve a at the horizontal dashed line. In this case, the bearing angle is either −90° or +90°. The state of the curves g and f are now evaluated to determine which of these two bearings is the true bearing angle to the emitting source. If the curve at f is high and the curve at g is low, then the bearing angle is −90°. If the curve at f is low and that at g high, then the bearing angle is +90°. Since only one or the other of the two conditions can exist at one time, a comparison of the ramp voltage with the state of the curves g and f will identify the true bearing angles. This analysis can be extended to anywhere along the 360° of mechanical angle defining the bearing to an emitting source. The selected of the two measurements produced in the phase measurement mode is then converted into an analog signal by the converter 72 and routed to a display, such as an oscilloscope.

Figure 7:
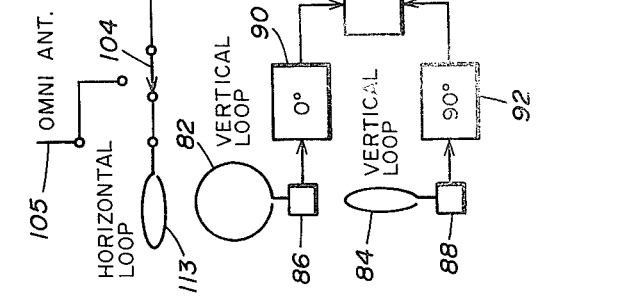
FIG. 7 is an alternate embodiment of the invention wherein the signal from a horizontal loop antenna is combined with a monopole antenna signal for polarization sensing.

Referring to FIG. 7, there is shown an alternate embodiment of the direction finder of the present invention wherein the polarization of the received radiation is sensed to correct the bearing angle signal for deviation of the polarization of the received energy from a preferred orientation. Orthogonal loop antennas 82 and 84 produce bearing information signals that are amplified in amplifiers 86 and 88, respectively. An output from the amplifier 86 is applied to a quadrature coupler 90 which introduces a fixed phase displacement into the amplifier output signal. Similarly, the output of the amplifier 88 is applied to a quadrature coupler 92 which also introduces a phase displacement into the output of the amplifier 88. The quadrature couplers 90 and 92 are adjusted to provide a 90° phase shift between the output of the coupler 90 and the coupler 92. This is a similar function as performed by the phase shifter 27 of FIG. 1. The quadrature coupler technique of FIG. 7 is intended to illustrate another method for introducing the 90° phase shift.

The two signals from the couplers 90 and 92 are applied to the input of a network 94 which performs the summing and difference functions of the networks 14 and 16, respectively. The summation output from the network 94 is applied to one input of a mixing amplifier 91 having a second input from a local oscillator 93. The IF output of the mixing amplifier 91 is applied to an amplifier 95 and then to a limiter 96 which is similar to the limiter 28 of FIG. 1. Similarly, the difference output of the network 94 is applied to a mixing amplifier 97 having a second input from the local oscillator 93. The IF output of the amplifier 97 is applied to an amplifier 98 and then to a limiter 99 which is similar to the limiter 32 of FIG. 1.

From the limiters 96 and 99, bearing information signals from the loop antennas 82 and 84 are applied to a phase detector 100. The phase detector 100 compares the output of the limiters 96 and 99 to generate a signal representing a multiple of the bearing angle. This bearing angle signal is digitized in a digitizer 101 and applied to a 2π-resolver 102. An output from the resolver 102 is connected to an ambiguity resolver 103 which is similar to the ambiguity resolver 44 of FIG. 1.

To provide unambiguous bearing angle data, a switch 104 connects a signal from a monopole or omni antenna 105 to a mixing amplifier 106. A second input to the mixing amplifier 106 is the output of the local oscillator 93. From the amplifier 106 a signal from the antenna 105 passes through an IF amplifier 107 to one input of a limiter 108 which is similar to the limiter 40 of FIG. 1. An output from the limiter 108 is applied to one input of a phase detector 109 which receives a second signal from the limiter 96. The output of the phase detector 109 is a coarse direction signal which is digitized in a digitizer 110 and applied to a second input of the ambiguity resolver 103. By a comparison of the output from the digitizer 110 and the resolver 102, the ambiguity resolver 103 provides an output signal related to the true bearing angle. This signal is passed through an "ARC SIN" converter 111 which produces a true bearing angle signal.

To resolve any error in the output of the converter 111 due to an excessive horizontal polarization component in the energy received at the antennas 82 and 84, the switch 104 connects a signal from a horizontal loop 113 to the mixing amplifier 106. In this mode, the output of the IF amplifier 95 and the IF amplifier 107 are compared in an amplifier comparator 115. The output of amplifier comparator 115 is a ratio of the horizontal to vertical polarization of the energy received at the antennas 82 and 84. This ratio is combined with the output of the converter 111 to correct the bearing angle signal from the converter 111 for any polarization error.

Figure 8:
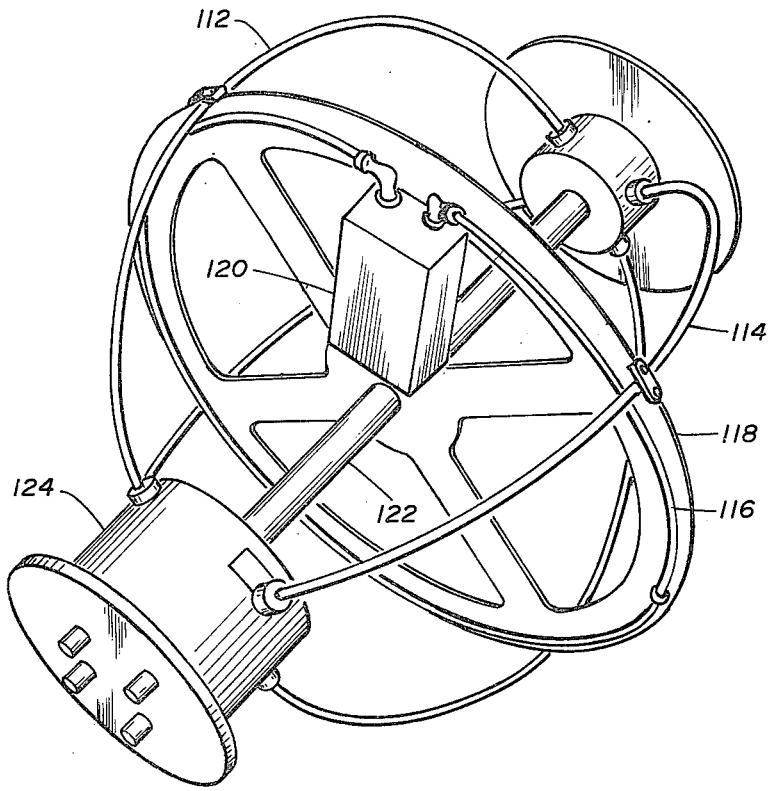
FIG. 8 is a perspective of an active loop antenna array for use with the direction finding system previously illustrated.

Referring to FIG. 8, there is shown an active loop antenna array for use in the system of FIG. 7. This antenna array is composed of two active vertical loop antennas 112 and 114 orthogonally mounted such that a diameter of each loop coincides. An active horizontal loop antenna 116 is located at the mid-point of the vertical loops. The loop antenna 116 is supported on a spoked wheel 118 mounted to the vertical loops 112 and 114. The active element for the horizontal loop 116 is mounted in a housing 120. An active capacitive loaded vertical sleeved monopole antenna 122 is mounted on the mutual axis of the vertical loops 112 and 114. The active element for the monopole 122 is located in the upper section of the sleeve. Active elements for the vertical loops 112 and 114 are mounted in a base housing 124.

As described previously, the two orthogonal vertical loops are used for bearing information by a comparison of the amplitude of the two loops. The output of the horizontal loop is used to compare the magnitude of horizontal polarization to vertical polarization as described. The monopole antenna 122 provides for ambiguity removal from the measured angle from the vertical loops.

Figure 9:
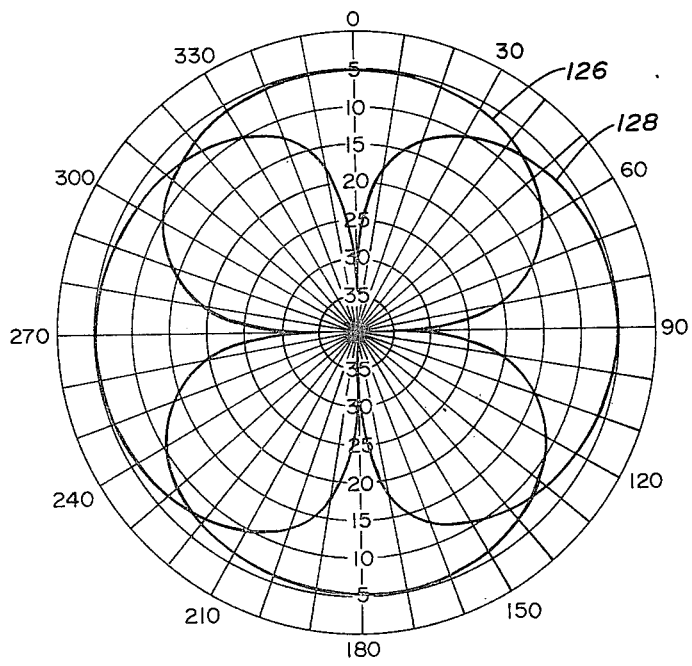
FIG. 9 is a polar log antenna pattern for the antenna array of FIG. 8.

Typical loop patterns for the antenna of FIG. 8 are illustrated in FIG. 9. The loop 126 represents a pattern from the antenna 112 and the loop 128 represents a pattern from the loop 114.

While several embodiments of the invention, together with modifications thereof, have been described in detail herein and shown in the accompanying drawings, various further modifications are possible without departing from the scope of the invention.

What is claimed is:

1. A system for determining the location of a source of emitting radiation with respect to an energy receiving antenna having two orthogonally mounted directional antennas, a nondirectional antenna, and means responsive to the signals from the directional antennas to generate sum and difference signals and to one of the directional antennas and the nondirectional antenna to generate a coarse direction signal, the improvement comprising:

a first phase detector responsive to the sum signal and the difference signal displaced by 90 electrical degrees from the sum signal for generating a quadrature related voltage;

a second phase detector responsive to sum and difference signals to generate an inphase reference voltage;

means responsive to the quadrature voltage and the inphase reference voltage to generate a multiple of the bearing angle to the emitting source; and means responsive to the multiple of the bearing angle signal and the coarse direction signal for generating a bearing angle signal.

2. A system for determining the location of the source of emitting radiation as set forth in claim 1 wherein said means responsive to the quadrature voltage and the inphase reference voltage generates two ramp functions combined to represent the multiple of the bearing angle to the emitting source.

3. A system for determining the location of a source of emitting radiation as set forth in claim 1 including means for limiting the quadrature voltage and the reference inphase voltage to the linear portions thereof.

4. A system for determining the location of a source of emitting radiation as set forth in claim 1 including means for shifting the phase of the difference signal with respect to the sum signal by 90 electrical degrees.

5. A system for determining the location of a source of emitting radiation with respect to an energy receiving antenna having two orthogonally mounted directional antennas, a nondirectional antenna, and means responsive to signals from the directional antennas to generate sum and difference signals, the improvement comprising:

switching means having an output terminal and coupling the sum signal to the output terminal in one position thereof, and connecting a signal from the nondirectional antenna to the output terminal in a second position thereof;

a first phase detector responsive to a signal at the output terminal of the switching means when in the first position and responsive also to the difference signal displaced by 90 electrical degrees from the sum signal for generating a quadrature related voltage, said phase detector generating a coarse direction signal with said switching means in the second position thereof; and a second phase detector responsive to the sum and difference signals to generate an inphase reference voltage;

means responsive to the quadrature voltage and the inphase reference voltage to generate a multiple of the bearing angle to the emitting source; and means responsive to the multiple of the bearing angle signal and the coarse direction signal for generating a bearing angle signal.

6. A system for determining the location of a source of emitting radiation as set forth in claim 5 including phase shifting means for shifting the phase of the difference signal by 90 electrical degrees with respect to the sum signal.

7. A system for determining the location of a source of emitting radiation as set forth in claim 2 wherein said means for generating a bearing angle signal includes means for combining the multiple of the bearing angle signal with the coarse direction signal to produce a first and second square wave voltage.

8. A system for determining the location of a source of emitting radiation as set forth in claim 7 wherein said means responsive to the quadrature voltage and the inphase reference voltage generates a first and second ramp function each covering 180° of bearing angle location.

9. A system for determining the location of a source of emitting radiation as set forth in claim 8 including means for comparing each of the two square waves with a value on one of the two ramp functions to generate the bearing angle signal.

10. A system for determining the location of a source of emitting radiation with respect to an energy receiving antenna having two orthogonally mounted directional antennas, a nondirectional antenna, a polarization sensing antenna, and means responsive to the signals from the directional antennas to generate sum and difference signals and to one of the directional antennas and the nondirectional antenna to generate a coarse direction signal, the improvement comprising:

a first phase detector responsive to the sum signal and the difference signal displaced by 90 electrical degrees from the sum signal for generating a quadrature related voltage;

a second phase detector responsive to sum and difference signals to generate an inphase reference voltage;

means responsive to the quadrature voltage and the inphase reference voltage to generate a multiple of the bearing angle to the emitting source;

means responsive to the multiple of the bearing angle signal and the coarse direction signal for generating a bearing angle signal; and means responsive to the signals from the polarization sensing antenna and one of the directional antennas for generating a signal representative of the ratio of horizontal polarization to vertical polarization at the energy receiving antenna as received from the emitting source.

11. A system for determining the location of a source of emitting radiation as set forth in claim 10 including phase shifting means for introducing a 90° phase shift in the difference signal with respect to the sum signal.

* * * * *